United States Patent
El-Barbari et al.

(10) Patent No.: US 9,780,675 B2
(45) Date of Patent: Oct. 3, 2017

(54) SYSTEM AND METHOD FOR CONTROLLING CURRENT IN A POWER CONVERTER

(71) Applicant: General Electric Company, Schenectady, NY (US)

(72) Inventors: Said Farouk El-Barbari, Munich (DE); Alvaro Jorge Mari Curbelo, Munich (DE); Simon Herbert Schramm, Moosach (DE)

(73) Assignee: General Electric Company, Niskayuna, NY (US)

( * ) Notice: Subject to any disclaimer, the term of this patent is extended or adjusted under 35 U.S.C. 154(b) by 17 days.

(21) Appl. No.: 14/965,904

(22) Filed: Dec. 11, 2015

(65) Prior Publication Data

US 2017/0170738 A1 Jun. 15, 2017

(51) Int. Cl.
*H02M 3/335* (2006.01)
*H02M 1/00* (2006.01)

(52) U.S. Cl.
CPC ............ *H02M 3/33546* (2013.01); *H02M 2001/0009* (2013.01)

(58) Field of Classification Search
CPC .. H02M 3/325; H02M 3/335; H02M 3/33569; H02M 3/33576; H02M 3/33592
See application file for complete search history.

(56) References Cited

U.S. PATENT DOCUMENTS

| | | | |
|---|---|---|---|
| 4,357,572 A | 11/1982 | Andersen et al. | |
| 4,524,412 A | 6/1985 | Eng | |
| 5,717,322 A | 2/1998 | Hawkes et al. | |
| 5,982,160 A | 11/1999 | Walters et al. | |
| 6,621,257 B2 | 9/2003 | Mitamura et al. | |
| 7,002,817 B2 | 2/2006 | Lipcsei | |
| 7,893,678 B2 | 2/2011 | Blanken | |
| 8,576,581 B2 * | 11/2013 | Caubert | H02M 7/53871 363/17 |

(Continued)

OTHER PUBLICATIONS

Kurokawa et al. "A new peak-current injected digital control circuit for dc-dc converter", Power Electronics and Applications (EPE 2011), Proceedings of the 2011-14th European Conference on, pp. 1-9, 2011.

(Continued)

*Primary Examiner* — Gary L Laxton
(74) *Attorney, Agent, or Firm* — Pabitra K. Chakrabarti

(57) ABSTRACT

A power converter is presented. The power converter includes a primary bridge unit coupled to a voltage source. Further, the power converter includes a secondary bridge unit coupled to a load. Also, the power converter includes a transformer disposed between the primary bridge unit and the secondary bridge unit and configured to magnetically couple the primary bridge unit to the secondary bridge unit. Additionally, the power converter includes a current sensor configured to measure instantaneous current flowing at an input terminal of the transformer. Furthermore, the power converter includes a cyclic state controller configured to receive the measured instantaneous current flowing at the input terminal of the transformer, and change a switching state of the power converter from a present switching state to a subsequent switching state based on the measured instantaneous current.

15 Claims, 4 Drawing Sheets

(56) References Cited

U.S. PATENT DOCUMENTS

| | | | |
|---|---|---|---|
| 8,614,564 B2 * | 12/2013 | Perisic | B60L 11/1811 363/17 |
| 8,829,871 B2 | 9/2014 | Bayer | |
| 2007/0139973 A1 * | 6/2007 | Leung | H02M 7/219 363/16 |
| 2014/0185328 A1 * | 7/2014 | Rosado | H02M 1/40 363/17 |

OTHER PUBLICATIONS

Trescases et al. "Digitally Controlled Current-Mode DC-DC Converter IC", Circuits and Systems I: Regular Papers, IEEE Transactions on , vol. 58, No. 1, pp. 219,231, Jan. 2011.

* cited by examiner

| S1 | S2 | S3 | S4 | S5 | S6 |
|---|---|---|---|---|---|
| $T_1=1$ $T_2=0$ $T_3=0$ $T_4=1$ $T_5=1$ $T_6=0$ $T_7=0$ $T_8=1$ | $T_1=1$ $T_2=0$ $T_3=1$ $T_4=0$ $T_5=1$ $T_6=0$ $T_7=0$ $T_8=1$ | $T_1=0$ $T_2=1$ $T_3=1$ $T_4=0$ $T_5=1$ $T_6=0$ $T_7=0$ $T_8=1$ | $T_1=0$ $T_2=1$ $T_3=1$ $T_4=0$ $T_5=0$ $T_6=1$ $T_7=1$ $T_8=0$ | $T_1=0$ $T_2=1$ $T_3=1$ $T_4=0$ $T_5=0$ $T_6=1$ $T_7=0$ $T_8=1$ | $T_1=0$ $T_2=1$ $T_3=1$ $T_4=0$ $T_5=0$ $T_6=1$ $T_7=0$ $T_8=1$ |

SYSTEM AND METHOD FOR CONTROLLING CURRENT IN A POWER CONVERTER

BACKGROUND

Embodiments of the present specification relate generally to power converters, and more particularly for controlling an instantaneous current in the power converters.

Typically, a power converter is employed to interface a power source to one or more electric loads. Also, the power converter is used to control flow of power from the power source to the one or more electric loads. Typically, the power converter includes solid state switches that are used to rapidly and/or intermittently interrupt or commutate an input current from the power source so as to effectuate conversion of the input current to an output current having different amplitudes and/or frequencies at the one or more electric loads. In one example, the power converter may be a direct current (DC) power converter that produces an output power at a substantially constant output voltage and/or current.

Furthermore, power conversion is a dynamic process that calls for rapidly sequenced changes in the state of the solid state switches in the power converter to interrupt or commutate the input current from the power source to the electric loads. Although the solid state switches exhibit high conduction or resistance in corresponding closed or open steady states, the solid state switches typically exhibit capacitive and resistive switching losses during a transition between the states. Also, at higher switching frequencies of the power converter, parasitic elements, such as leakage inductance of a transformer and parasitic inductance of a cable may become more dominant, and hence may result in higher switching losses in the power converter.

Conventionally, the power flow is controlled by adjusting the phase shift between a primary side voltage and a secondary side voltage of the power converter. This phase shift control technique is simple to implement and allows a large operating range. However, this phase shift control technique can drive large currents inside the converter components when a voltage ratio is substantially different from a transformer ratio of the power converter. These large currents in turn result in higher conduction and switching losses in the solid state switches. Also, the current may exceed the maximum current capability of the components in the power converter, thereby resulting in damage to the components in the power converter.

BRIEF DESCRIPTION

In accordance with aspects of the present specification, a power converter is presented. The power converter includes a primary bridge unit coupled to a voltage source. Further, the power converter includes a secondary bridge unit coupled to a load. Also, the power converter includes a transformer disposed between the primary bridge unit and the secondary bridge unit and configured to magnetically couple the primary bridge unit to the secondary bridge unit. Additionally, the power converter includes a current sensor configured to measure instantaneous current flowing at an input terminal of the transformer. Furthermore, the power converter includes a cyclic state controller configured to receive the measured instantaneous current flowing at the input terminal of the transformer, and change a switching state of the power converter from a present switching state to a subsequent switching state based on the measured instantaneous current.

In accordance with a further aspect of the present specification, a method for controlling an instantaneous current in a power converter is presented. The method includes measuring, by a current sensor, instantaneous current flowing at an input terminal of the transformer. Further, the method includes receiving, by a cyclic state controller, the measured instantaneous current flowing in the transformer. Also, the method includes changing, by the cyclic state controller, a switching state of a power converter from a present switching state to a subsequent switching state based on the measured instantaneous current.

In accordance with another aspect of the present specification, a power distribution system is presented. The power distribution system includes a voltage source and an electric load. Further, the power distribution system includes a power converter disposed between the voltage source and the electric load, wherein the power converter includes a primary bridge unit coupled to the voltage source. Also, the power converter includes a secondary bridge unit coupled to the electric load. Further, the power converter includes a transformer disposed between the primary bridge unit and the secondary bridge unit and configured to magnetically couple the primary bridge unit to the secondary bridge unit. In addition, the power converter includes a current sensor configured to measure instantaneous current flowing at an input terminal of the transformer. Furthermore, the power converter includes a cyclic state controller configured to receive the measured instantaneous current flowing at the input terminal of the transformer, and change a switching state of the power converter from a present switching state to a subsequent switching state based on the measured instantaneous current.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for controlling an instantaneous current in a power converter are presented. In particular, the systems and methods presented herein aid in switching electronic switches in the power converter in a predefined pattern to control the instantaneous current in the power converter. By controlling the instantaneous current, conduction and switching losses in the power converter may be substantially reduced. Also, the current in the power converter may be prevented from exceeding the maximum current capability of components in the power converter, which in turn prevents damaging the components in the power converter.

Figure 1:
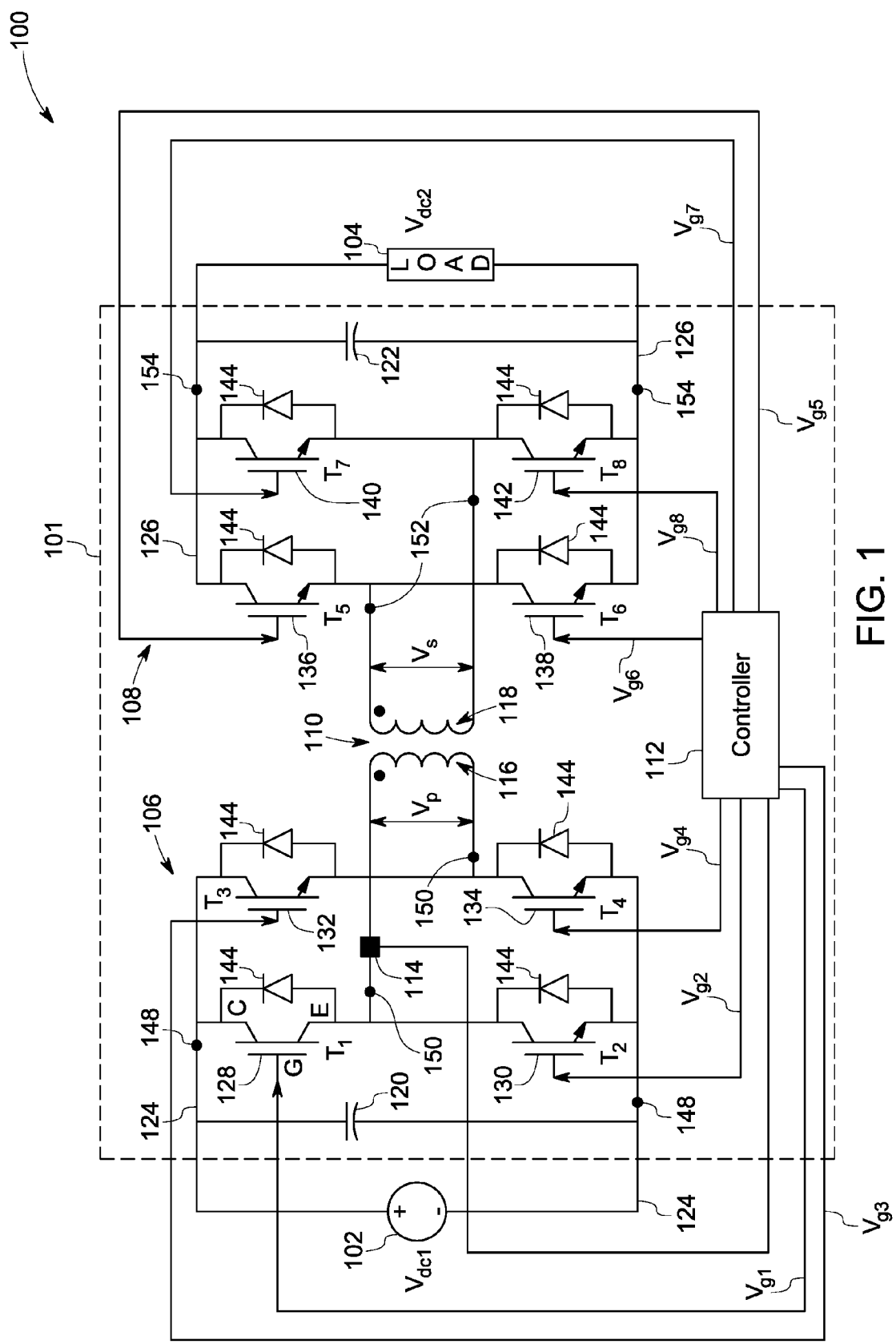
FIG. 1 is a schematic diagram of a power distribution system having a power converter, in accordance with aspects of the present specification.

Turning now to the drawings and referring to FIG. 1, a schematic diagram of a power distribution system 100, in accordance with aspects of the present specification, is depicted. The power distribution system 100 includes a power converter 101, a voltage source 102, and an electric load 104. The power converter 101 may be coupled between the voltage source 102 and the electric load 104. Further, the power converter 101 may be used to interface two isolated direct current (DC) links, where one of the DC links may be coupled to the voltage source 102, while the other DC link may be coupled to the electric load 104. In one example, the voltage source 102 may be a DC voltage source. Also, the power converter 101 may be arranged in a dual active bridge (DAB) topology to provide an adjustable bi-directional power flow between the two isolated DC links over a broad range of voltage ratios. As will be appreciated, the voltage ratio is a ratio of an input voltage to an output voltage. It may be noted that the power converter 101 may be arranged in other types of topologies, and is not limited to DAB topology depicted in FIG. 1. Also, in one embodiment, the DAB topology may have half bridge topology or a three level topology, and is not limited to H-bridge topology as depicted in FIG. 1.

Also, the power converter 101 may be a switching power converter that may be switched between a plurality of switching states (see FIG. 2) to interrupt and/or commutate an input current from the voltage source 102 to the electric load 104. Moreover, the power converter 101 may operate at a determined switching frequency to control the power flow from the voltage source 102 to the electric load 104. In one example, the power converter 101 may operate at a switching frequency that is above 400 Hz.

In a presently contemplated configuration, the power converter 101 includes a primary bridge unit 106 and a secondary bridge unit 108. Additionally, the power converter 101 includes a transformer 110, a cyclic state controller 112, and a current sensor 114. As depicted in FIG. 1, the transformer 110 has a primary winding 116 and a secondary winding 118. Also, the transformer 110 is used to magnetically couple the primary bridge unit 106 and the secondary bridge unit 108. Further, the primary bridge unit 106 is coupled in parallel to the voltage source 102, while the secondary bridge unit 108 is coupled in parallel to an electric load 104. Particularly, the primary bridge unit 106 is coupled to the voltage source 102 and configured to receive a primary DC voltage $V_{dc1}$ from the voltage source 102 and provide a primary AC voltage $V_p$ across the primary winding 116 of the transformer 110. Also, the primary bridge unit 106 may provide an alternating current flow through the primary winding 116 of the transformer 110.

Similarly, the secondary bridge unit 108 is coupled to the electric load 104 and configured to provide a secondary DC voltage $V_{dc2}$ across the electric load 104 by commutating a secondary AC voltage $V_s$ that is induced in the secondary winding 118 of the transformer 110. In one embodiment, the secondary AC voltage $V_s$ may be phase shifted from the primary AC voltage $V_p$ to control the flow of power in the power converter 101. In one example, this phase shift may be determined based on the demand for power at the electric load 104. In one example, this phase shift may be determined so as to facilitate transfer of a maximum value of power to the electric load 104 without affecting/stressing the components in the power converter 101. Further, capacitors 120, 122 may be disposed across DC links 124, 126 of the primary and secondary bridge units 106, 108 to aid in smoothing of the voltage across the electric load 104 by reducing voltage ripples.

Moreover, as depicted in FIG. 1, the primary bridge unit 106 includes a first electronic switch $T_1$ 128, a second electronic switch $T_2$ 130, a third electronic switch $T_3$ 132, and a fourth electronic switch $T_4$ 134. These electronic switches 128, 130, 132, 134 are coupled to each other to form a primary H-bridge circuit. In one example, the primary H-bridge circuit 106 may include DC terminals 148 and AC terminals 150. The voltage source 102 is coupled to the DC terminals 148 of the primary H-bridge circuit 106, while the AC terminals 150 of the primary H-bridge circuit 106 are coupled to the primary winding 116 of the transformer 110.

In a similar manner, the secondary bridge unit 108 includes a fifth electronic switch $T_5$ 136, a sixth electronic switch $T_6$ 138, a seventh electronic switch $T_7$ 140, and an eighth electronic switch $T_8$ 142. These electronic switches 136, 138, 140, 142 are coupled to each other to form a secondary H-bridge circuit. In one example, the secondary H-bridge circuit may include AC terminals 152 and DC terminals 154. The AC terminals 152 of the secondary H-bridge circuit are coupled to the secondary winding 118 of the transformer 110, while the DC terminals 154 of the secondary H-bridge circuit are coupled to the electric load 104.

Further, each of the electronic switches $T_1$-$T_8$ 128-142 may be a solid state switch with terminals, such as a collector C, a gate G, and an emitter E. In one example, the electronic switches $T_1$-$T_8$ 128-142 may be insulated-gate bipolar transistors (IGBTs). Also, each of the electronic switches $T_1$-$T_8$ 128-142 may have a corresponding freewheeling diode 144, which is connected in an anti-parallel configuration across the collector C and the emitter E of the respective electronic switch. It may be noted that the terms "electronic switches" and "solid state switches" may be used interchangeably.

In one embodiment, the electronic switches $T_5$-$T_8$ 136-142 in the secondary bridge unit 108 may be similar to corresponding switches $T_1$-$T_4$ 128-134 in the primary bridge unit 106. By way of example, the fifth electronic switch $T_5$ 136 is similar to the first electronic switch $T_1$ 128 in that the first electronic switch $T_1$ 128 is connected to a positive terminal of the DC link 124, while the fifth electronic switch $T_5$ 136 is connected to a positive terminal of the DC link 126. Also, each of the switches $T_1$ 128, $T_5$ 136 in a corresponding bridge unit functions similar to the other switch in a corresponding bridge unit. Moreover, the electronic switches $T_6$-$T_8$ 138-142 are similar to the electronic switches and $T_2$-$T_4$ 130-134.

Furthermore, the cyclic state controller 112 is configured to change a switching state of the power converter 101 to maintain a value of instantaneous current in the power converter 101 below a designed value of current. In one example, the term instantaneous current is used to refer to an electrical current flowing in the power converter 101 when the power converter 101 is activated. Also, the term designed value of current is used to refer to a threshold value of electrical current in the power converter 101 beyond which the power converter 101 may be damaged.

Moreover, the cyclic state controller 112 is electrically coupled to each of the electronic switches $T_1$-$T_8$ 128-142 in the primary bridge unit 106 and the secondary bridge unit 108 to control instantaneous current flow in the power converter 101. Particularly, the cyclic state controller 112 may communicate trigger voltages $V_{g1}$, $V_{g2}$, $V_{g3}$, $V_{g4}$, $V_{g5}$, $V_{g6}$, $V_{g7}$, $V_{g8}$ in a determined timing pattern to the electronic switches $T_1$-$T_8$ 128-142 to activate or deactivate the corresponding electronic switches $T_1$-$T_8$ 128-142 in the power converter 101. As a consequence, the voltage drop across these electronic switches $T_1$-$T_8$ 128-142 may vary, thereby resulting in a reduction in the value of the current in the power converter 101. This reduction in the value of the current in the power converter 101 prevents the current in the power converter 101 from exceeding the designed value of current. Also, the direction of the current flow in the primary winding 116 and the second winding 118 of the transformer 110 may be varied due to switching of the electronic switches $T_1$-$T_8$ 128-142 in the power converter 101. As a result, the value of the instantaneous current in the power converter 101 may be maintained within the designed value of current.

In a conventional system, a cyclic state controller may determine a timing of the trigger voltages based on the instantaneous current estimated in the system. In one example, the instantaneous current may be estimated prior to operating the system. However, during operation of the system, this instantaneous current in the power converter may vary due to increase in leakage inductance of the transformer and/or parasitic inductance of a cable coupled to the power converter. This in turn results in power loss in the power converter. Also, at high switching frequencies, the instantaneous current may exceed the maximum current capability of the components in the power converter. As a consequence, the components in the power converter may be subjected to huge stress, which may result in damage to these components.

To address the above shortcomings, in the exemplary power converter of FIG. 1, a current sensor 114 is provided in the power converter. The current sensor 114 measures the instantaneous current in real-time during the operation of the power converter 101. Further, the cyclic state controller 112 may transmit the trigger voltages $V_{g1}$, $V_{g2}$, $V_{g3}$, $V_{g4}$, $V_{g5}$, $V_{g6}$, $V_{g7}$, $V_{g8}$ to the respective electronic switches $T_1$-$T_8$ 128-142 based on the measured instantaneous current. More specifically, in one exemplary embodiment, the current sensor 114 is coupled to the primary winding 116 of the transformer 110. The current sensor 114 is employed to measure instantaneous current flowing at an input terminal or the primary winding 116 of the transformer 110. In another embodiment, the current sensor 114 may be coupled to an output terminal or the secondary winding 118 of the transformer 110 to measure instantaneous current flowing at the secondary winding 118 of the transformer 110. In yet another embodiment, the current sensor 114 may be employed to measure instantaneous current flowing at the primary winding and the secondary winding of the transformer 110.

Further, the current sensor 114 communicates the measured instantaneous current to the cyclic state controller 112. The cyclic state controller 112 may sample the measured instantaneous current at a determined sampling rate. Also, the cyclic state controller 112 may compare the sampled instantaneous current with a reference value associated with one of a plurality of switching states of the power converter 101. The reference value may be selected such that the reference value has a value that is less than the designed value of current. Following the comparison, if it is determined that the instantaneous current has a value equal to that of the reference value, the cyclic state controller 112 may activate or deactivate corresponding switches $T_1$-$T_8$ 128-142 in the power converter 101. This selective activation and/or deactivation of the switches $T_1$-$T_8$ 128-142 in turn interrupt the current flow and hence maintain the instantaneous current below the reference value. The aspect of interrupting the current and controlling the instantaneous current using different switching states of the power converter 101 will be described in greater detail with reference to FIGS. 2-3. Also, as the instantaneous current is measured and compared continuously, this arrangement of the power converter 101 prevents the electrical current from exceeding the reference value, which in turn averts damage to the components in the power converter 101.

Figures 2, 3:
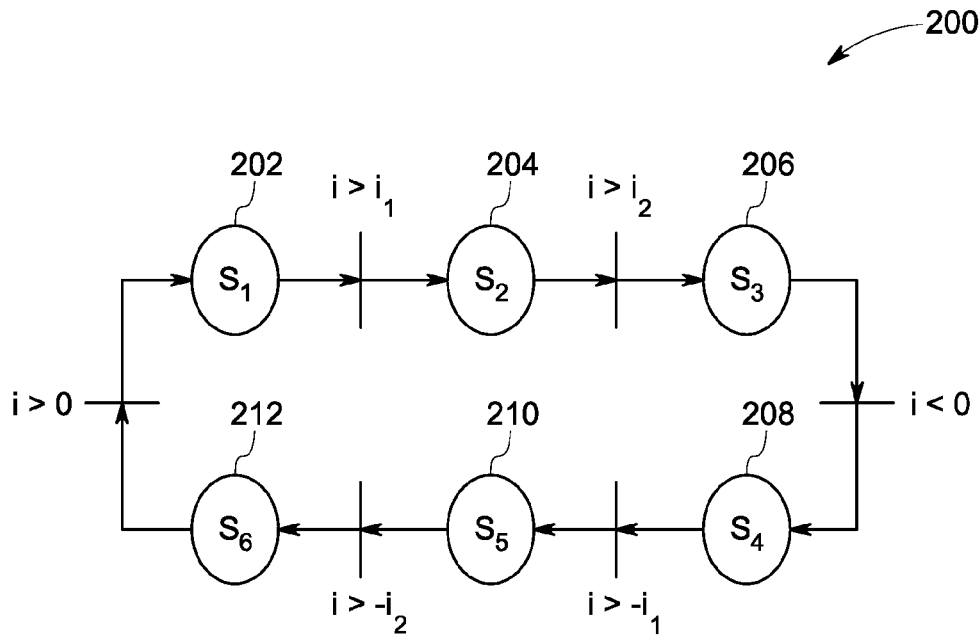
FIG. 2 illustrates a state machine of the power converter of FIG. 1, in accordance with aspects of the present specification.
FIG. 3 is a table illustrating switching states of electronic switches in the power converter of FIG. 1, in accordance with aspects of the present specification.
Figure 4:
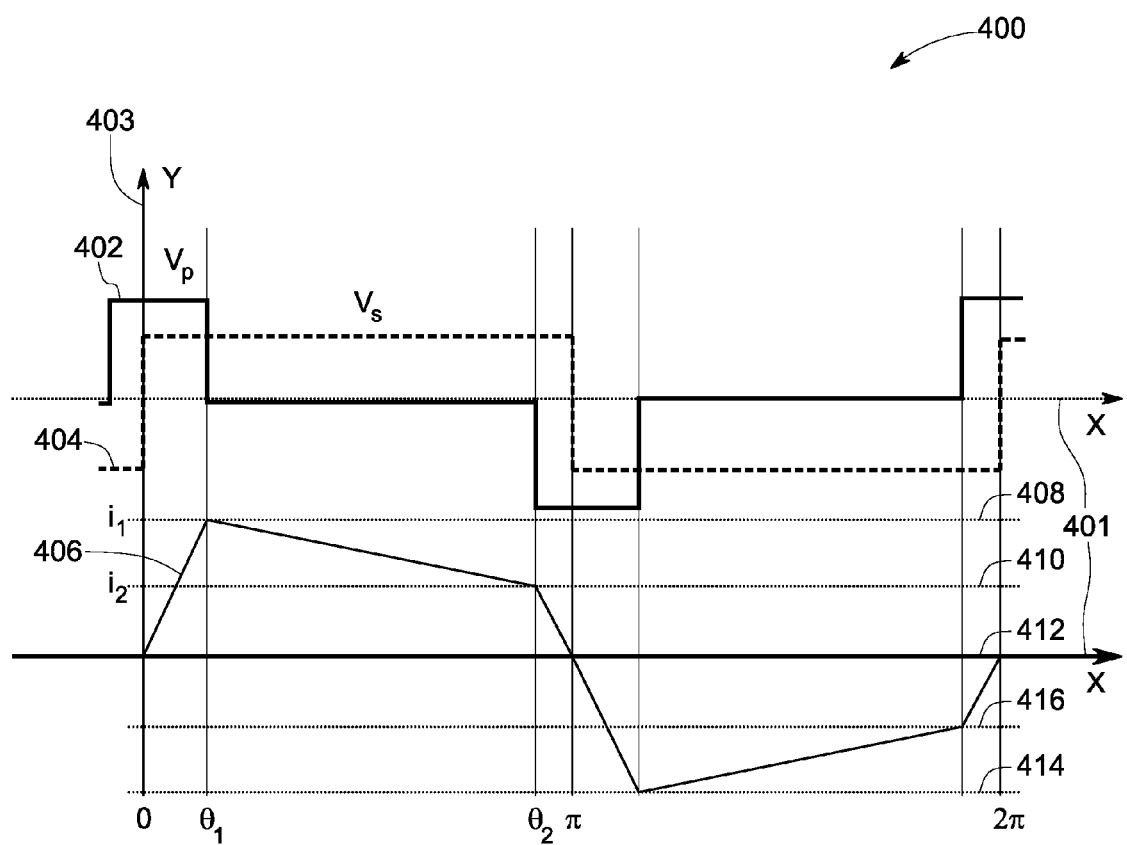
FIG. 4 illustrates a graphical representation of voltages and currents across different states of the power converter of FIG. 2, in accordance with aspects of the present specification.

Referring to FIG. 2, a state machine 200 illustrating different switching states of the power converter 101 of FIG. 1, in accordance with aspects of the present specification, is depicted. Also, FIG. 3 is a table 300 depicting ON state or OFF state of the electronic switches in each of the switching states. Further, FIG. 4 depicts graphical representations 400 of voltages and currents associated with different switching states of the power converter 101. For ease of understanding, FIGS. 2-4 are described with reference to the components in FIG. 1. The state machine 200 may represent a fundamental cycle of the power converter 101, where the power converter 101 switches from one state to another state in sequence to control an instantaneous current in the power converter 101. In one example, the cyclic state controller 112 may follow the state machine 200 that includes a plurality of switching states based on electrical power desired at the load 104.

In the embodiment of FIG. 2, the state machine 200 includes a sequence of six switching states, such as a first switching state $S_1$ 202, a second switching state $S_2$ 204, a third switching state $S_3$ 206, a fourth switching state $S_4$ 208, a fifth switching state $S_5$ 210, and a sixth switching state $S_6$ 212. This sequence of the six switching states $S_1$-$S_6$ forms the fundamental cycle of the power converter 101. It may be noted that the state machine 200 may include any number of switching states, and is not limited to six switching states depicted in FIG. 2. Also, these switching states $S_1$-$S_6$ are representative of non-overlapping states.

Furthermore, in each of these switching states $S_1$-$S_6$ 202-212, a different combination of electronic switches $T_1$-$T_8$ 128-142 in the power converter 101 may be activated (switched to an ON state) or deactivated (switched to an OFF state), as depicted in table 300 of FIG. 3.

Particularly, the table 300 depicts corresponding ON states or OFF states of the electronic switches $T_1$-$T_8$ 128-142 in their respective switching states $S_1$-$S_6$ 202-212. It may be noted that in the table 300, the ON state is represented by binary value '1' while the OFF state is represented by binary value '0.'

More specifically, in a first switching state $S_1$ 202, the electronic switches $T_1$ 128, $T_4$ 134, $T_5$ 136, $T_8$ 142 are activated, while the electronic switches $T_2$ 130, $T_3$ 132, $T_6$ 138, $T_7$ 140 are deactivated. Similarly, in a second switching state $S_2$ 204, the electronic switches $T_1$ 128, $T_3$ 132, $T_5$ 136, $T_8$ 142 are activated, while the electronic switches $T_2$ 130, $T_4$ 134, $T_6$ 138, $T_7$ 140 are deactivated. Moreover, in one embodiment, in a third switching state $S_3$ 206, the electronic switches $T_2$ 130, $T_3$ 132, $T_5$ 136, $T_8$ 142 are activated and the electronic switches $T_1$ 128, $T_4$ 134, $T_6$ 138, $T_7$ 140 are deactivated. Also, in a fourth switching state $S_4$ 208, the electronic switches $T_2$ 130, $T_3$ 132, $T_6$ 138, $T_7$ 140 are activated, while the electronic switches $T_1$ 128, $T_4$ 134, $T_5$ 136, $T_8$ 142 are deactivated. In a fifth switching state $S_5$ 210, the electronic switches $T_2$ 130, $T_3$ 132, $T_6$ 138, $T_8$ 142 are activated, while the electronic switches $T_1$ 128, $T_4$ 134, $T_5$ 136, $T_7$ 140 are deactivated. Similarly, in a sixth switching state $S_6$ 212, the electronic switches $T_2$ 130, $T_3$ 132, $T_6$ 138, $T_8$ 142 are activated, while the electronic switches $T_1$ 128, $T_4$ 134, $T_5$ 136, $T_7$ 140 are deactivated. Moreover, each of these electronic switches $T_1$-$T_8$ 128-142 in the primary bridge unit 106 and the secondary bridge unit 108 may be activated or deactivated based on trigger voltages $V_{g1}$, $V_{g2}$, $V_{g3}$, $V_{g4}$, $V_{g5}$, $V_{g6}$, $V_{g7}$, $V_{g8}$ provided by the cyclic state controller 112.

Also, each of these switching states $S_1$-$S_6$ 202-212 may have a corresponding reference value for the instantaneous current in the power converter 101. This reference value of the instantaneous current may vary from one switching state to another switching state, which is shown in FIG. 4.

Particularly, FIG. 4 illustrates waveforms of current and voltages in the power converter 101. Moreover, reference numeral 402 represents a primary DC voltage $V_p$ waveform, while reference numeral 404 represents the secondary DC voltage $V_s$ waveform. Also, reference numeral 406 represents an instantaneous current waveform at the input terminal of the transformer 110. Moreover, X-axis 401 represents time and Y-axis 403 represents amplitude of the current and voltage waveforms 402, 404, 406.

Further, in the example of FIG. 4, the instantaneous current waveform 406 is illustrated with two positive reference values, a zero reference value, and two negative reference values. The two positive reference values may be referred to as a first reference value 408 and a second reference value 410. The zero reference value may be referred to as a third reference value 412. Similarly, the two negative reference values may be referred to as a fourth reference value 414 and a fifth reference value 416. Moreover, the first reference value 408 is greater than the second reference value 410, and the second reference value 410 is greater than the third reference value 412. Similarly, the third reference value 412 is greater than the fifth reference value 416, and the fifth reference value 416 is greater than the fourth reference value 414.

Additionally, in the first switching state $S_1$ 202, the first reference value 408 may be representative of the reference value corresponding to the first switching state $S_1$ 202, while the second reference value 410 may be representative of the reference value corresponding to the second switching state $S_2$ 204. Also, in the third switching state $S_3$ 206, the third reference value 412 may be representative of the reference value corresponding to the third switching state $S_3$ 206 and in the fourth switching state $S_4$ 208, the fourth reference value 414 may be representative of the reference value corresponding to the fourth switching state $S_4$ 208. Moreover, in the fifth switching state $S_5$ 210, the fifth reference value 416 may be representative of the reference value corresponding to the fifth switching state $S_5$ 210. In the sixth switching state $S_6$ 212, the third reference value 412 may be representative of the reference value corresponding to the sixth switching state $S_6$ 212.

During operation of the power converter 101, a current sensor 114 in the power converter 101 measures instantaneous current flowing at an input terminal or primary winding 116 of the transformer 110. Further, the current sensor 114 communicates the measured instantaneous current to the cyclic state controller 112. At the cyclic state controller 112, the measured instantaneous current is sampled at a determined sampling rate. In one example, the cyclic state controller 112 may sample the instantaneous current at a sampling frequency of 100 kHz.

Further, the cyclic state controller 112 may compare the sampled instantaneous current with the reference value corresponding to the switching state of the power converter 101. It may be noted that when the power converter 101 is activated or turned ON, the power converter 101 initiates a fundamental cycle of controlling the power flow from the first switching state $S_1$ 202. Hence, the reference value may be initially associated with the first reference value 408.

Furthermore, in the first switching state $S_1$ 202, as the reference value is associated with the first reference value 408, the cyclic state controller 112 may compare the instantaneous current 406 with the first reference value 408. If the instantaneous current 406 is equal to the first reference value 408, the cyclic state controller 112 may transmit/communicate the trigger voltages $V_{g1}$, $V_{g2}$, $V_{g3}$, $V_{g4}$, $V_{g5}$, $V_{g6}$, $V_{g7}$, $V_{g8}$ to the plurality of electronic switches $T_1$-$T_8$ 128-142 in the power converter 101. The trigger voltages $V_{g1}$, $V_{g2}$, $V_{g3}$, $V_{g4}$, $V_{g5}$, $V_{g6}$, $V_{g7}$, $V_{g8}$ may be used to activate or deactivate corresponding electronic switches in the power converter 101. As previously noted, in the first switching state $S_1$ 202, the electronic switches $T_1$ 128, $T_4$ 134, $T_5$ 136, $T_8$ 142 are activated, while the electronic switches $T_2$ 130, $T_3$ 132, $T_6$ 138, $T_7$ 140 are deactivated. By activating and/or deactivating the electronic switches in the first switching state $S_1$ 202 of the power converter 101, the instantaneous current 406 in the power converter 101 may be reduced linearly, as depicted in FIG. 4. Further, the cyclic state controller 112 may change the switching state of the power converter 101 from the first switching state $S_1$ 202 to the second switching state $S_2$ 204.

In the second switching state $S_2$ 204, the cyclic state controller 112 may continuously monitor the reduction in the instantaneous current 406. Also, as the reference value is represented by the second reference value 410 in the second switching state $S_2$ 204, the cyclic state controller 112 may compare the instantaneous current 406 with the second reference value 410. If the instantaneous current 406 is equal to the second reference value 410, the cyclic state controller 112 may transmit trigger voltages $V_{g1}$, $V_{g2}$, $V_{g3}$, $V_{g4}$, $V_{g5}$, $V_{g6}$, $V_{g7}$, $V_{g8}$ to activate or deactivate corresponding switches in the power converter 101. As previously noted, in the second switching state $S_2$ 204, the electronic switches $T_1$ 128, $T_3$ 132, $T_5$ 136, $T_8$ 142 are activated, while the electronic switches $T_2$ 130, $T_4$ 134, $T_6$ 138, $T_7$ 140 are deactivated. Furthermore, the cyclic state controller 112 may change the switching state of the power converter 101 from the second switching state $S_2$ 204 to the third switching state $S_3$ 206.

In the third switching state $S_3$ 206, the instantaneous current 406 in the power converter 101 may now reduce at a much higher rate than in the second switching state $S_2$ 204. Furthermore, in the third switching state $S_3$ 206, the cyclic state controller 112 may continuously monitor the reduction/drop in the instantaneous current 406. When the instantaneous current 406 is equal to the third reference value 412 that is associated with the reference value in the third switching state $S_3$ 206, the cyclic state controller 112 may transmit trigger voltages $V_{g1}$, $V_{g2}$, $V_{g3}$, $V_{g4}$, $V_{g5}$, $V_{g6}$, $V_{g7}$, $V_{g8}$ to activate or deactivate corresponding switches in the power converter 101. As previously noted, in the third switching state $S_3$ 206, the electronic switches $T_2$ 130, $T_3$ 132, $T_5$ 136, $T_8$ 142 are activated, while the electronic switches $T_1$ 128, $T_4$ 134, $T_6$ 138, $T_7$ 140 are deactivated. As a consequence, the instantaneous current 406 in the power converter may further reduce linearly, as depicted in FIG. 4. It may be noted that the current cycle of the instantaneous current 406 may change from a positive half cycle to a negative half cycle by the end of the third switching state $S_3$ 206, as depicted in FIG. 4. Also, the switching state of the power converter 101 is changed from the third state $S_3$ 206 to the fourth state $S_4$ 208.

Moreover, in the fourth switching state $S_4$ 208, the cyclic state controller 112 may continuously monitor the reduction/drop in the instantaneous current 406. When the instantaneous current 406 reaches the fourth reference value 414 that is associated with the reference value in the fourth switching state $S_4$ 208, the cyclic state controller 112 may transmit trigger voltages $V_{g1}$, $V_{g2}$, $V_{g3}$, $V_{g4}$, $V_{g5}$, $V_{g6}$, $V_{g7}$, $V_{g8}$ to activate or deactivate corresponding switches in the power converter 101. As previously noted, in the fourth switching state $S_4$ 208, the electronic switches $T_2$ 130, $T_3$ 132, $T_6$ 138, $T_7$ 140 are activated, while the electronic switches $T_1$ 128, $T_4$ 134, $T_5$ 136, $T_8$ 142 are deactivated. Further, the cyclic state controller 112 may change the switching state of the power converter 101 from the fourth switching state $S_4$ 208 to the fifth switching state $S_5$ 210.

In the fifth switching state $S_5$ 210, the instantaneous current 406 in the power converter 101 may gradually increase from the fourth reference value 414. Furthermore, in the fifth switching state $S_5$ 210, the cyclic state controller 112 may continuously monitor the increase in the instantaneous current 406. When the instantaneous current 406 reaches the fifth reference value 416 that is associated with the reference value in the fifth switching state $S_5$ 210, the cyclic state controller 112 may transmit trigger voltages $V_{g1}$, $V_{g2}$, $V_{g3}$, $V_{g4}$, $V_{g5}$, $V_{g6}$, $V_{g7}$, $V_{g8}$ to activate or deactivate corresponding switches in the power converter 101. As previously mentioned, in the fifth switching state $S_5$ 210, the electronic switches $T_2$ 130, $T_3$ 132, $T_6$ 138, $T_8$ 142 are activated, while the electronic switches $T_1$ 128, $T_4$ 134, $T_5$ 136, $T_7$ 140 are deactivated. As a consequence, the instantaneous current 406 in the power converter 101 corresponding to the fifth switching state $S_5$ 210 may increase at a much higher rate than in the fourth switching state $S_4$ 208, as depicted in FIG. 4. Also, the cyclic state controller 112 may change the switching state of the power converter 101 from the fifth switching state $S_5$ 210 to the sixth switching state $S_6$ 212.

In the sixth switching state $S_6$ 212, the cyclic state controller 112 may continuously monitor the increase in the instantaneous current 406. When the instantaneous current 406 reaches the third reference value $S_3$ 412 that is associated with the reference value in the sixth switching state $S_6$ 212, the cyclic state controller 212 may transmit trigger voltages $V_{g1}$, $V_{g2}$, $V_{g3}$, $V_{g4}$, $V_{g5}$, $V_{g6}$, $V_{g7}$, $V_{g8}$ to activate or deactivate corresponding switches in the power converter 101. As previously mentioned, in the sixth switching state $S_6$ 212, the electronic switches $T_2$ 130, $T_3$ 132, $T_6$ 138, $T_8$ 142 are activated, while the electronic switches $T_1$ 128, $T_4$ 134, $T_5$ 136, $T_7$ 140 are deactivated. This in turn increases the instantaneous current 406 in the power converter 101, as depicted in FIG. 4. Also, it may be noted that, current cycle of the instantaneous current 406 may change from the negative half cycle to a positive half cycle by the end of the sixth switching state $S_6$ 212, as depicted in FIG. 4. Furthermore, when the instantaneous current 406 increases and reaches the third reference value 412, the cyclic state controller 112 may restart another fundamental cycle by cycling through the switching states from the first switching state $S_1$ 202 to the sixth switching state $S_6$ 212.

Thus, the instantaneous current is monitored in real-time, and the electronic switches $T_1$-$T_8$ 128-142 may be accordingly activated and/or deactivated to maintain the instantaneous current in the power converter below a designed value of instantaneous current of the power converter 101. This in turn prevents huge stress on the components in the power converter 101, which further prevents the components in the power converter 101 from being damaged.

Figure 5:
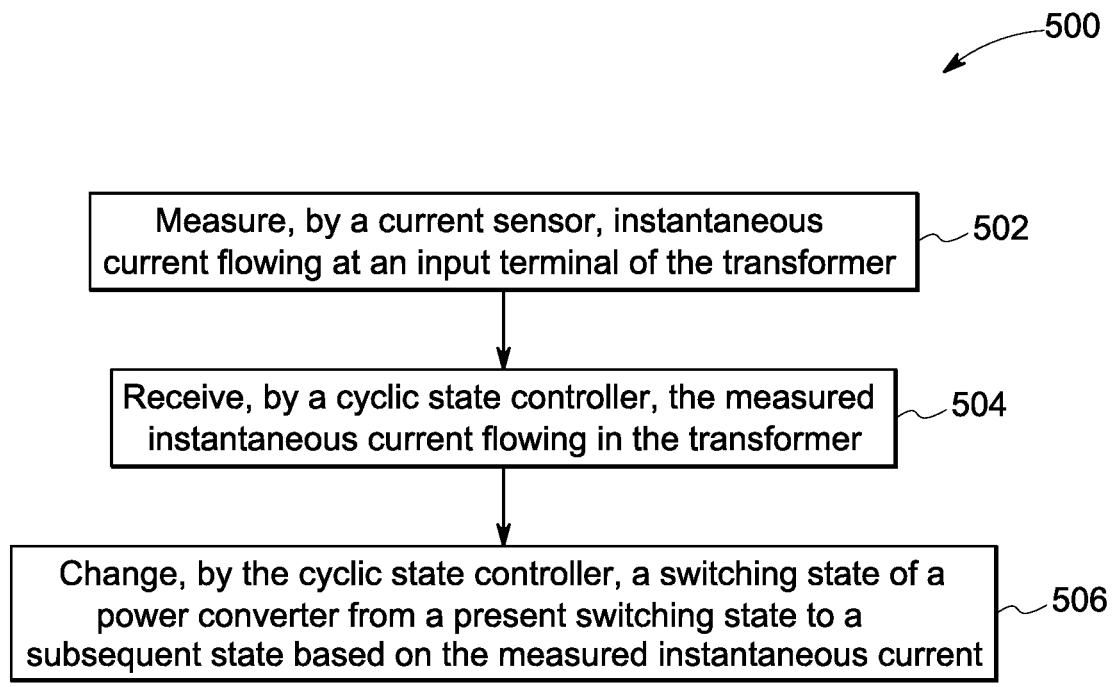
FIG. 5 is a flow chart illustrating a method for controlling an instantaneous current in the power converter of FIG. 1, in accordance with aspects of the present specification.

Referring to FIG. 5, a flow chart illustrating a method 500 for controlling an instantaneous current in a power converter, such as the power converter 101 of FIG. 1, in accordance with another aspect of the present specification, is depicted. For ease of understanding, the method 500 is described with reference to the components in FIGS. 1-4. The method 500 begins at step 502, where an electrical signal associated with an electrical current at an input terminal of a transformer 110 is measured. To that end, a current sensor 114 is used to measure an instantaneous current flowing at the input terminal of the transformer 110.

Subsequently, at step 504, the instantaneous current measured at the input terminal of the transformer 110 is received by the cyclic state controller 112. More particularly, the cyclic state controller 112 that is electrically coupled to the current sensor 114 may receive the measured instantaneous current from the current sensor 114.

Furthermore, at step 506, a switching state associated with the power converter 101 is changed from a present switching state to a subsequent switching state based on the measured instantaneous current. Particularly, the cyclic state controller 112 may follow a state machine that includes a plurality of switching states based on electrical power desired at the load 104. In one example, the plurality of switching states includes at least the present switching state and the subsequent switching state of the power converter 101. In one embodiment, the present switching state may be representative of one of the switching states depicted in FIG. 2, while the subsequent switching state may be representative of the other switching states in FIG. 2 that follows the present switching state.

In addition, the cyclic state controller 112 may determine the present switching state of the power converter 101. Thereafter, the cyclic state controller 112 may switch the power converter 101 from present switching state to the subsequent switching state when the instantaneous current is equal to the reference value corresponding to the present switching state. The reference value may be associated with one of the reference values 408, 410, 412, 414, and 416 based on the switching state of the power converter 101.

The various embodiments of the exemplary system and method aid in switching electronic switches in the power converter to control the instantaneous current in the power converter. By controlling the instantaneous current, conduction and switching losses in the power converter may be substantially reduced. Also, the current in the power converter may be prevented from exceeding the maximum current carrying capability of components in the power converter, which in turn prevents damage to the components in the power converter.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power converter, comprising:
 a primary bridge unit coupled to a voltage source;
 a secondary bridge unit coupled to a load;
 a transformer disposed between the primary bridge unit and the secondary bridge unit and configured to magnetically couple the primary bridge unit to the secondary bridge unit;

a current sensor configured to measure instantaneous current flowing at an input terminal of the transformer;
a cyclic state controller configured to:
receive the measured instantaneous current flowing at the input terminal of the transformer;
change a switching state of the power converter from a present switching state to a subsequent switching state based on the measured instantaneous current, wherein to change the switching state of the power converter, the cyclic state controller is configured to follow a state machine comprising a plurality of switching states based on an electrical power desired at the load, wherein the plurality of switching states comprises at least the present switching state and the subsequent switching state, and wherein each of the plurality of switching states is associated with one of a first reference value, a second reference value, a third reference value, a fourth reference value, and a fifth reference value; and
restart the plurality of switching states after each fundamental cycle of the power converter.

2. The power converter of claim 1, wherein the cyclic state controller is configured to change the switching state of the power converter to maintain the instantaneous current below a designed value.

3. The power converter of claim 1, wherein the current sensor is electrically coupled to one of the input terminal and an output terminal of the transformer and configured to:
measure the instantaneous current flowing at one of the input terminal and the output terminal of the transformer; and
communicate the measured instantaneous current to the cyclic state controller.

4. The power converter of claim 3, wherein the cyclic state controller is configured to:
sample the measured instantaneous current at a determined sampling rate;
compare the sampled instantaneous current with a reference value corresponding to the present switching state, wherein the reference value is one of the first reference value, the second reference value, the third reference value, the fourth reference value, and the fifth reference value based on the present switching state; and
change the switching state from the present switching state to the subsequent switching state based on the comparison.

5. The power converter of claim 1, wherein the primary bridge unit comprises a plurality of electronic switches coupled to each other to form a primary H-bridge circuit, and wherein the secondary bridge unit comprises a plurality of electronic switches coupled to each other to form a secondary H-bridge circuit.

6. The power converter of claim 5, wherein the transformer comprises:
a primary winding coupled to alternating current terminals of the primary H-bridge circuit; and
a secondary winding coupled to alternating current terminals of the secondary H-bridge circuit.

7. The power converter of claim 6, wherein the cyclic state controller is configured to activate or deactivate at least one of the plurality of electronic switches in one of the primary H-bridge circuit and the secondary H-bridge circuit to change the switching state associated with the power converter.

8. The power converter of claim 1, wherein the plurality of switching states comprises one or more sequential and non-overlapping states.

9. The power converter of claim 1, wherein the cyclic state controller is configured to monitor the instantaneous current in real-time in each of the plurality of switching states.

10. A method, comprising:
measuring, by a current sensor, instantaneous current flowing at an input terminal of a transformer;
receiving, by a cyclic state controller, the measured instantaneous current flowing in the transformer;
changing, by the cyclic state controller, a switching state of a power converter from a present switching state to a subsequent switching state based on the measured instantaneous current, wherein changing the switching state of the power converter comprises following a state machine comprising a plurality of switching states based on an electrical power desired at a load, wherein the plurality of switching states comprises at least the present switching state and the subsequent switching state, and wherein each of the plurality of switching states is associated with one of a first reference value, a second reference value, a third reference value, a fourth reference value, and a fifth reference value; and
restarting, by the cyclic state controller, the plurality of switching states after each fundamental cycle of the power converter.

11. The method of claim 10, wherein changing the switching state of the power converter comprises:
sampling the measured instantaneous current at a determined sampling rate;
comparing the sampled measured instantaneous current with a reference value corresponding to the present switching state, wherein the reference value is one of the first reference value, the second reference value, the third reference value, the fourth reference value, and the fifth reference value based on the present switching state; and
changing the switching state from the present switching state to the subsequent switching state based on the comparison.

12. The method of claim 11, wherein changing the switching state associated with the power converter comprises activating or deactivating at least one of a plurality of electronic switches in the power converter to change the switching state associated with the power converter.

13. The method of claim 11, wherein changing the switching state of the power converter comprises:
determining that the power converter is operating in the present switching state;
identifying the reference value corresponding to the present switching state; and
switching the power converter from the present switching state to the subsequent switching state based on a comparison of the measured instantaneous current with the reference value corresponding to the present switching state.

14. The method of claim 10, further comprising monitoring the instantaneous current in real-time to maintain the instantaneous current below a designed value.

15. A power distribution system, comprising:
a voltage source;
an electric load;
a power converter disposed between the voltage source and the electric load, wherein the power converter comprises:
a primary bridge unit coupled to the voltage source;
a secondary bridge unit coupled to the electric load;

a transformer disposed between the primary bridge unit and the secondary bridge unit and configured to magnetically couple the primary bridge unit to the secondary bridge unit;

a current sensor configured to measure instantaneous current flowing at an input terminal of the transformer;

a cyclic state controller configured to:
receive the measured instantaneous current flowing at the input terminal of the transformer;
change a switching state of the power converter from a present switching state to a subsequent switching state based on the measured instantaneous current, wherein to change the switching state of the power converter, the cyclic state controller is configured to follow a state machine comprising a plurality of switching states based on an electrical power desired at the electric load, wherein the plurality of switching states comprises at least the present switching state and the subsequent switching state, and wherein each of the plurality of switching states is associated with one of a first reference value, a second reference value, a third reference value, a fourth reference value, and a fifth reference value; and
restart the plurality of switching states after each fundamental cycle of the power converter.

* * * * *